April 11, 1933.  W. HINZ  1,903,426

VALVE

Filed June 20, 1930  2 Sheets-Sheet 1

Inventor
Walter Hinz.

April 11, 1933.    W. HINZ    1,903,426
VALVE
Filed June 20, 1930    2 Sheets-Sheet 2
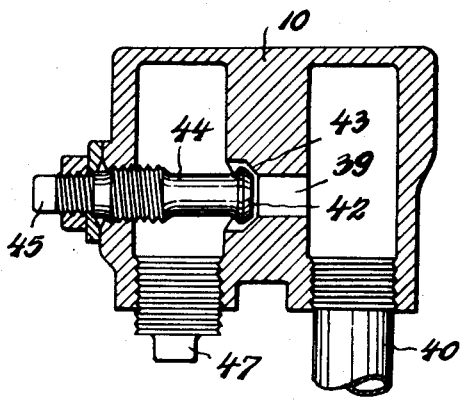
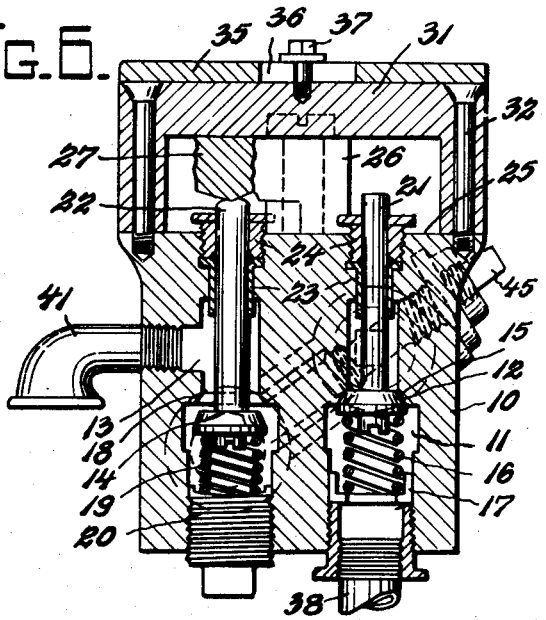
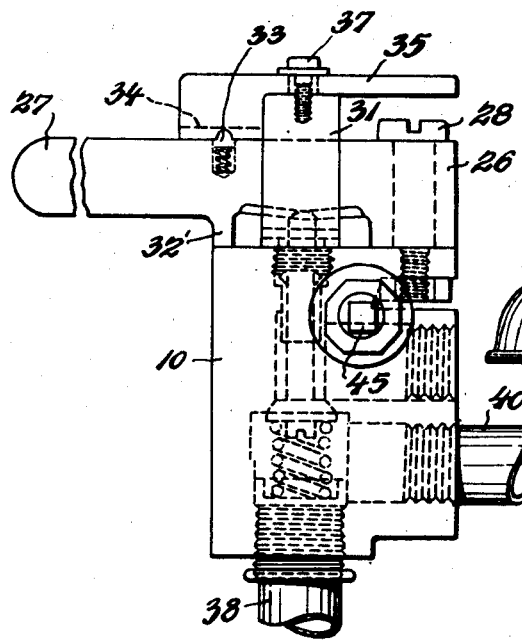
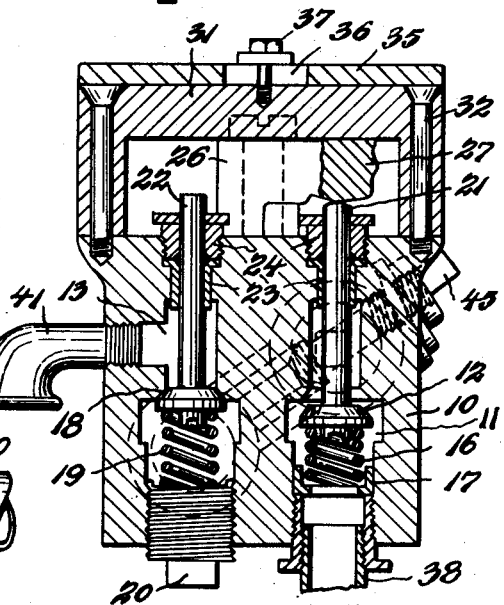
INVENTOR.
Walter Hinz.

Patented Apr. 11, 1933

1,903,426

UNITED STATES PATENT OFFICE

WALTER HINZ, OF EAST CLEVELAND, OHIO, ASSIGNOR TO THE FERRO MACHINE & FOUNDRY COMPANY, OF CLEVELAND, OHIO, A CORPORATION OF OHIO

VALVE

Application filed June 20, 1930. Serial No. 462,680.

This invention relates to valves, and more particularly to an improved form of fluid control valve.

Many forms of control valves are now available for controlling actuating fluid, such as compressed air, which is extensively used in the operation of various kinds of apparatus. It has been found, however, that these control valves do not function satisfactorily nor efficiently when used in connection with certain apparatus, such as the molding equipment of foundries, because they embody cooperating seat and valve portions which are relatively slidable and are soon scratched and scored by molding sand which reaches these parts, resulting in rapid deterioration and in the escape of fluid pressure.

It is therefore an object of this invention to provide an improved form of fluid control valve which is compact and efficient, and in which there are no relatively slidable cooperating seat and valve portions.

Another object of this invention is to provide a fluid control device in which a fulcrumed operating member constrained to move in a fixed path, is provided with cam means for actuating valve means of the poppet type.

A further object of this invention is to provide a control device having adjustable means for indicating the position of the operating member which corresponds with a desired valve opening.

Still another object of this invention is the provision of a control device having adjustable means for limiting the flow of fluid through the passage of the device to a desired value while the valve controlling said passage is fully opened.

Other objects and advantages of this invention will be apparent from the following description, taken in conjunction with the accompanying sheets of drawings, in which, Figure 1 is a top plan view in which a control device constructed according to my invention is shown with the operating handle in neutral position, Fig. 2 is a side elevational view of the device as shown in Fig. 1.

Fig. 3 is a sectional view taken on line 3—3 of Fig. 2,

Fig. 4 is a side elevation of the device showing the operating handle in the initial valve opening position, Fig. 5 is a sectional view taken on line 5—5 of Fig. 1 and showing the intake valve in open position, and Fig. 6 is a similar sectional view taken on line 6—6 of Fig. 1 and showing the exhaust valve in open position.

Figure 1:
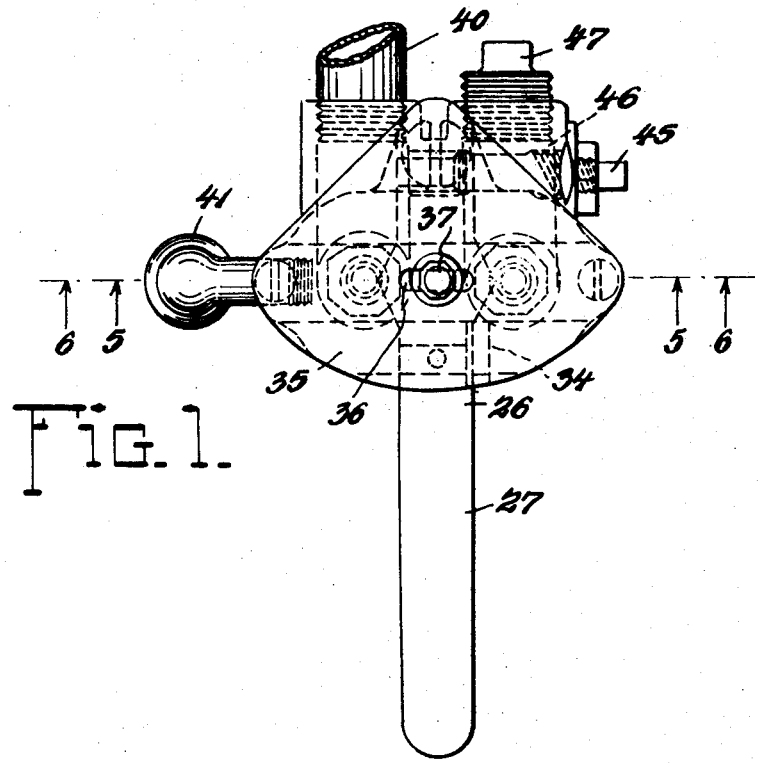
Figure 2:
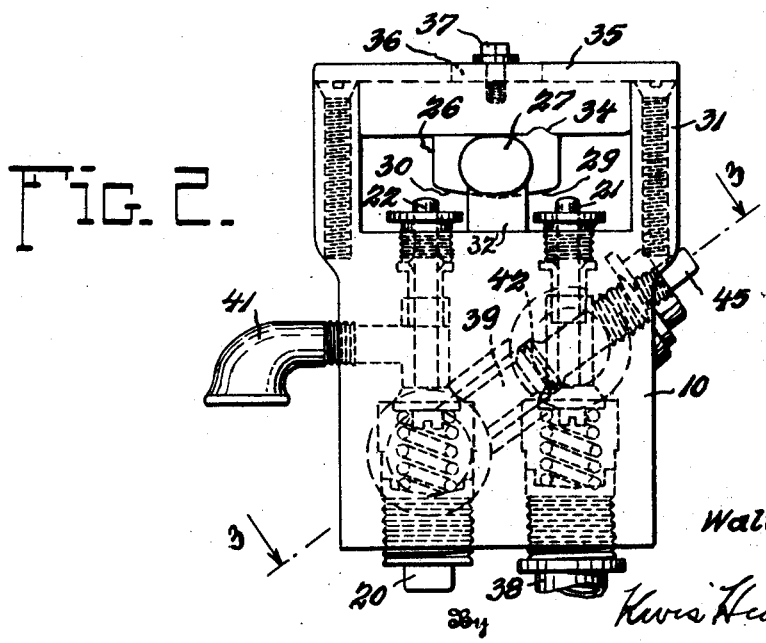

In the accompanying drawings to which detailed reference will now be made, I have shown one of the many forms in which fluid control devices embodying the principle of my invention may be constructed. This control device, as herein illustrated, comprises a casing or valve body member 10 having a fluid intake passage 11 which is controlled by the poppet valve 12, and a fluid exhaust passage 13 which is controlled by a poppet valve 14. The valve 12 is normally held against its seat 15 by the coil spring 16 which is arranged in the fluid intake passage 11 with one end thereof in engagement with the valve and the opposite end thereof abutting against the bushing 17. In a similar manner, the valve 14 is normally held against its seat 18 by the coil spring 19 arranged in the exhaust passage 13 with one end thereof in engagement with the valve and its other end abutting against the plug 20. The valves 12 and 14 are provided respectively with actuating stems 21 and 22 which are reciprocably slidable in the bushings 23 and in the gland members 24 which are mounted in the valve body member 10. These actuating stems are of sufficient length to extend through the gland members 24 and to project above the plane surface 25 of the valve body into the path of movement of the actuating member 26.

This actuating member is constructed with a handle portion 27, at one end thereof and at its other end is fulcrumed upon the pivot pin 28 which is mounted in the valve body. Intermediate its pivoted end and the handle portion 27 the actuating member is provided with oppositely inclined cam surfaces 29 and 30, which are so arranged that when the handle 27 is moved to the right to swing the actuating member about its fulcrum, the cam surface 29 engages the valve stem 21 and moves the valve 12 away from its seat 15 against the action of the spring 16. Likewise, when the actuating member is swung to the left about its fulcrum the inclined cam surface 30 engages the valve stem 22 and moves the valve 14 away from its seat 18 against the action of the spring 19.

For constraining the actuating member to move in a fixed path, so that its inclined cam surfaces will properly engage the respective valve stems, I provide a substantially U-shaped body member 31, which is secured to the valve casing 10 by means of suitable screws 32. The member 31 extends over the actuating member so as to clamp the latter against the plane surface 25 of the valve casing sufficiently tight to prevent movement of the actuating member in any direction, except in a plane which is transverse to the paths in which the valve stems 21 and 22 are reciprocably movable. The actuating member 26 is preferably provided with a depending lug 32', which is spaced from the fulcrum 28 and slidably engages the plane surface 26 to prevent tilting of the actuating member and thus assists in constraining the latter to move in the desired plane.

It is sometimes desirable in the operation of certain kinds of machinery, such as molding apparatus, to provide for a slow initial movement of the apparatus by limiting the extent of the initial opening movement of the fluid supply valve. For indicating such a desired restricted opening of the supply valve 12 of my control device, I provide the actuating member 26 with a spring pressed movable plunger 33, which is adapted to releasably engage in the slot 34 of the plate 35 which is clamped to the body member 31. When the actuating member is swung toward the right the plunger 33 engages in the slot 34, thus arresting the movement of the actuating member and indicating to the operator that the supply valve has been opened slightly and that actuating fluid is being supplied to the apparatus at a rate which will cause a slow initial movement, such as may be desired in the use of molding machinery for separating a sand mold from the pattern. After the slow initial movement of the apparatus has continued for a sufficient period of time to accomplish the desired result, the operator moves the handle further to the right, thus opening the valve 12 further to supply additional actuating fluid to accelerate the operation of the apparatus.

To provide for variations in the size of the restricted initial valve opening, so that the slow initial movement of the apparatus may correspond with a desired rate, I have made the plate 35 adjustable with respect to the valve casing. To provide for this adjustment of the plate 35 I construct the latter with an elongated opening 36, through which the clamping member 37 extends. By means of this elongated opening the plate 35 may be shifted to the right or left with respect to the valve casing to correspondingly increase or diminish the angular distance through which the actuating member must be swung in order to bring the plunger 33 thereof into engagement with the slot 34. When the plate 35 is set for a small angular movement of the actuating member the corresponding initial opening of the supply valve will be very small, while, on the other hand, when the plate 35 is set for a relatively large angular movement of the actuating member, the corresponding initial opening of the supply valve will be comparatively large. By this arrangement the operator is able to quickly and accurately determine the extent to which the actuating member should be moved to produce a desired slow initial movement of the apparatus.

When the supply valve 12 has been opened by movement of the actuating member to the right, fluid pressure delivered to the passage 11 by the supply pipe 38 flows through the passage 39, and then to the apparatus through suitable means such as the delivery pipe 40. During the period of time that the supply valve is open the exhaust valve 14 is held against its seat by the spring 19, so as to prevent the escape of fluid pressure through the exhaust passage 13. When the actuating member is swung to the left the supply valve 12 is released, and is moved against its seat by the spring 16. Upon further movement of the actuating member to the left the exhaust valve 14 is unseated against the action of the spring 19 and the actuating fluid which was supplied to the apparatus through the pipe 40 now returns through this pipe and is exhausted through the passage 13 and through the elbow fitting 41 leading from this passage.

For regulating the supply of fluid to the apparatus when the supply valve is fully opened so that the apparatus will be actuated at a uniform predetermined rate, I provide means for regulating the flow of fluid through the passage 39. This regulating means may be of any suitable form but, as here illustrated, comprises a valve seat 42 and a valve member 43 which is arranged to cooperate with the valve seat and which has an actuating stem 44. This stem is screw-threaded in an opening provided through the wall of the valve casing and at its outer end has a square or suitably shaped portion 45, which may be readily engaged by a suitable tool for rotating the stem. By such rotation the stem may be screwed into or out of the threaded opening of the valve casing, so as to vary the position of the valve 43 with respect to its seat 42, and thus regulate the cross-sectional area of the passage 39.

It will be noted that adjacent the supply valve 12 the casing 10 is provided with a passage 46, which is normally closed by the plug 47. If desired this plug may be removed and fluid may be supplied to the apparatus directly from the passage 46 instead of through the pipe 40, the latter being used only as a fluid return or exhaust passage. When the valve is arranged to supply fluid to the apparatus through the passage 46, the valve 42 would, of course, be moved into engagement with its seat 43, so as to completely close the passage 39.

It will now be readily seen that I have provided a simple and compact form of control device, in which there are no relatively slidable cooperating valve and seat parts to be scored by sand or grit which finds its way into the valve casing. The supply and exhaust valves in my control device are of the poppet type, and readily adjust themselves on their respective seats, so that when the device has been properly assembled and adjusted practically no attention is required for maintaining it in condition to render efficient service throughout a long period of usage.

While I have illustrated and described the control device of my invention in a detailed manner, it should be understood, however, that I do not intend to limit myself to the precise details shown and described, but regard my invention as including such changes and modifications as do not involve a departure from the spirit of the invention and the scope of the appended claims.

Having thus described my invention what I claim is:

1. In apparatus of the character described the combination of a body having a fluid passage, a valve seat associated with said passage, a valve for cooperation with said seat and having an actuating stem reciprocable in said body, an operating member pivoted on said body and having means adapted to engage said stem, and means for indicating a position of said operating member which corresponds with a desired valve opening, the last mentioned means including a member adjustably mounted with respect to said body, and a spring pressed detent movably mounted on one of said members for releasable engagement in a recess on the other of said members.

2. In apparatus of the character described the combination of a body having a fluid passage therein, a valve seat associated with said passage, a valve for cooperation with said seat and having an actuating stem reciprocably mounted in said body, means for actuating said valve comprising a fulcrumed operating member, and an element secured to said body and extending over said operating member for constraining the latter to move in a plane extending transversely of the axis of said stem, said operating member being provided with means adapted for engagement with said stem upon movement of said operating member about its fulcrum, and means for indicating a position of said operating member which corresponds with a desired valve opening, the last mentioned means including a member adjustably mounted on said element, and a spring-pressed detent movably mounted on one of the members for releasable engagement in a recess on the other member.

In testimony whereof, I hereunto affix my signature.

WALTER HINZ.